UNITED STATES PATENT OFFICE.

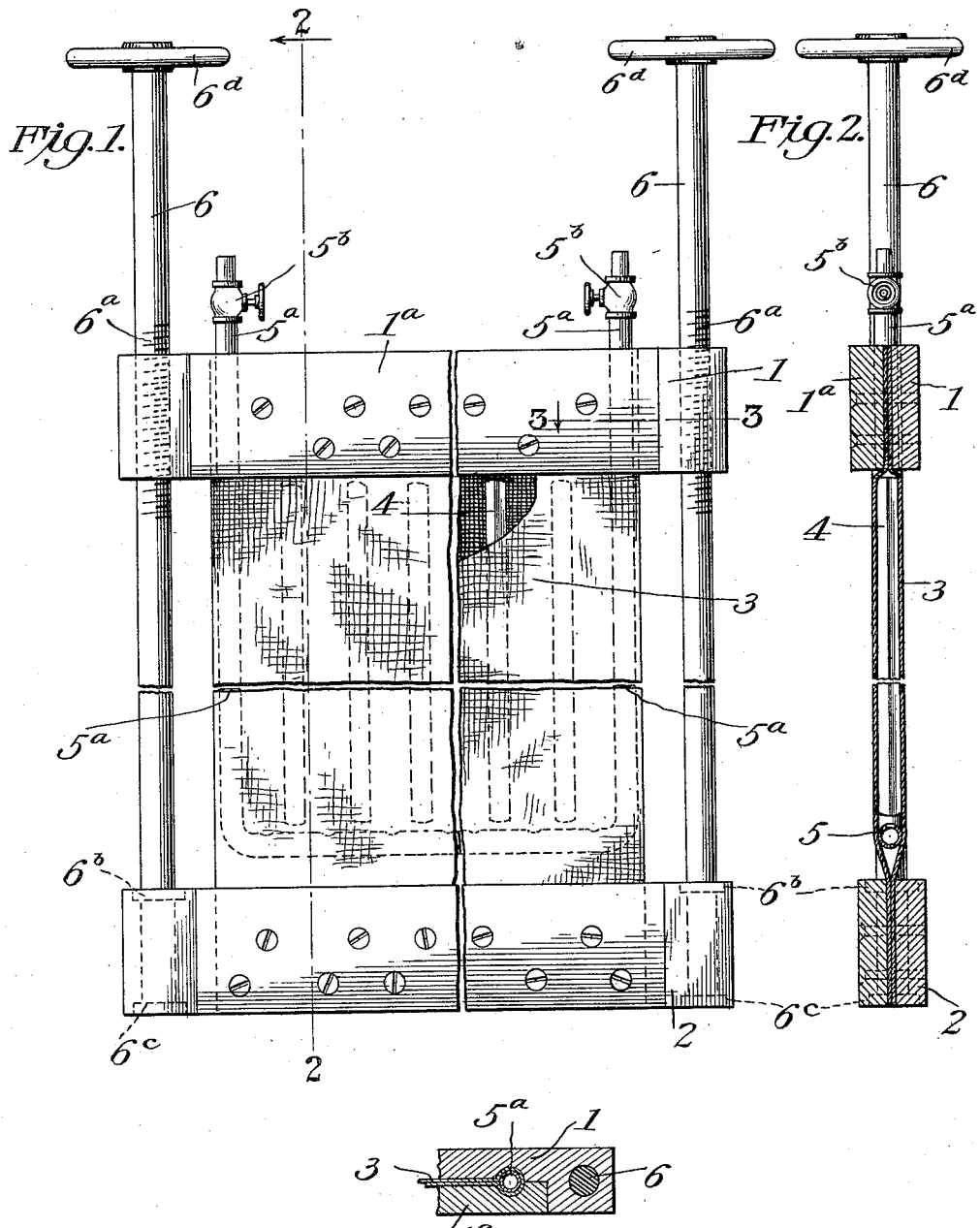

CHARLES L. VAN FOSSEN, OF HASTINGS-UPON-HUDSON, NEW YORK, ASSIGNOR TO N. Y. SANITATION-FILTRATION CO., OF NEW YORK, N. Y., A CORPORATION OF NEW YORK.

FILTER-LEAF.

1,078,812.  Specification of Letters Patent.  Patented Nov. 18, 1913.

Application filed June 10, 1913. Serial No. 772,900.

*To all whom it may concern:*

Be it known that I, CHARLES L. VAN FOSSEN, of Hastings-upon-Hudson, in the county of Westchester and State of New York, have invented certain new and useful Improvements in Filter-Leaves; and I hereby declare that the following is a full, clear, and exact description thereof, reference being had to the accompanying drawings, which form part of this specification.

This invention is an improvement in so-called filter leaves which are employed in processes of filtration, or for the separation of suspended solids from liquids with which they are mixed, such filter leaves being ordinarily in the form of a thin hollow plate of large superficial area having its exterior walls formed of canvas or other suitable material, the side walls thereof being separated, ordinarily, by thin strips of wood or other non-corrodible material.

The object of the present invention is to provide such filter leaves with means whereby the canvas, or filtering medium forming the outer walls of such leaf can be variably tensioned, or stretched more or less tightly, according to the nature of the material being filtered, and enabling such medium to be put under such tension as will best fit it for use in filtering the particular mixture being treated; and also to enable such medium to be relaxed after the filtration process to facilitate the discharge of the cake of solid matters collected upon the surface of such filter leaf by reversely passing air or liquid through such filtering medium.

The accompanying drawings illustrate one form of filter leaf and means for varying the tension of the canvas or filtering medium walls thereof, and I will explain the invention as embodied in such a leaf to impart a clear understanding of the same to those skilled in the art, but I do not consider the invention restricted to the specific construction shown in the said drawings, and have set forth in the claims the essential features of the invention and novel details of construction therein for which I desire protection.

In said drawings: Figure 1 is a side elevation of one form of filter leaf, partly broken away, and having means for stretching the filtering medium or fabric. Fig. 2 is an enlarged vertical section on line 2—2, Fig. 1. Fig. 3 is an enlarged detail section on line 3—3, Fig. 1.

As shown in the drawings the filter leaf comprises a top bar 1 and a bottom bar 2 to and between which is connected a bag or double walled filter preferably formed of canvas or other suitable material; the upper ends of the walls 3 of said filter may be secured to the bar 1 by means of a clamp plate 1ª screwed to the said bar, and the lower ends of the said walls 3 may be similarly secured to the bottom bar 2. The side walls 3 of the filter are slightly distended and separated by means of interposed parallel strips 4, preferably made of wood or other non-corrodible material and are arranged between the bars 1 and 2.

Within the filter leaf is a suction pipe, which preferably has a bottom portion 5 below the strips 4, and has upright portions 5ª adjacent the ends of the filter, said portions 5ª extending through the top bar 1 and may be connected above said bar to any suitable suction apparatus, not shown, and may be provided with stop-cocks 5ᵇ. Such filter leaf is adapted to be used in the ordinary manner by submerging it in the mixture to be separated, and then the liquid is withdrawn through the leaf by suction applied to the pipe 5. As the liquid is withdrawn through the filter the solids in the mixture are deposited upon the outer surface of the leaf until such a quantity has collected thereon as undesirably impedes and retards the filtration process, whereupon the leaf may be cleared from the matters accumulated thereon by reversing the current through the leaf; or by withdrawing the caked leaf from the mixture and then blowing air or water therethrough in the reverse direction, thus clearing the walls thereof of the accumulated matter thereon.

In filtering it frequently is desirable to have the filtering fabric stretched loosely when used for the filtration of certain kinds of mixtures; and again, it is desirable to have the fabric stretched tightly when filtering other kinds of mixtures, especially where very finely suspended matters are to be separated from the mixtures. By my invention I provide for varying the tension of the filtering fabric so as to enable the same leaf to be used for the various kinds of mixtures or materials being treated. The tensioning of the filtering medium is changed by the effect of the liquids thereon; and while at first the medium may be of the desired tension it ultimately changes and its effectiveness as a filtering medium becomes impaired. To overcome this objection and to adapt the filter for most efficient use with different mixtures in the most efficient manner I provide means for stretching or relaxing the filtering medium whenever desired, which means is illustrated in the drawings and comprises two adjusting rods 6 which pass through the bar 1 and have their lower ends rotatably engaged with the bar 2. As shown each rod 6 has a threaded portion $6^a$ engaging a correspondingly internally threaded opening in the bar 1, and the lower end of such bar is rotatably engaged with a hole in the bar 2 but is kept from longitudinal movement relative to bar 2 by means of collars $6^b$ and $6^c$ fixed on the rod above and below the bar 2, as shown. The rods 6 may be rotated by any suitable means; for instance I have shown them as provided with hand wheels $6^d$ on their upper ends by which they can be turned. By turning these rods 6 the bar 2 can be moved to or from the bar 1, and when moved away from the bar 1 the filtering medium 3 will be tensioned, and when bar 2 is moved toward bar 1 the filtering medium will be relaxed. Therefore by properly manipulating the rods 6 the filtering medium can be put under any desired tension, and be stretched tightly or loosely at will. And when it is desired to discharge accumulated matters from the surface of the filter the filtering medium can be relaxed thereby facilitating the separation of the accumulated matters from the outer surfaces of the leaf.

What I claim is:

1. In combination with a filter leaf comprising a hollow bag formed of a filtering medium, means for separating the walls of such bag, and means for withdrawing liquid from the interior of such leaf; with adjusting devices exterior to the bag and not penetrating the walls thereof, whereby the tension of the filtering medium can be varied, substantially as described.

2. A filter leaf comprising upper and lower bars, walls of flexible filtering material connected to and between said bars, and adjusting means located wholly exterior to said leaf and not penetrating the walls thereof, whereby the bars may be relatively shifted toward or from each other to vary the tension of said filtering material.

3. A filter leaf comprising upper and lower bars, walls of flexible filtering material connected to and between said bars; strips interposed between the said walls, and means for withdrawing liquid from the interior of said leaf; with adjusting means exterior to the said leaf and not penetrating the walls thereof whereby the bars may be adjusted toward or from each other to vary the tension of said walls, substantially as described.

4. A filter leaf comprising upper and lower bars, an imperforate bag of flexible filtering material connected to and between said bars, means interposed between the walls of the bag for distending the same, and means for withdrawing liquid from the interior of said bag; with adjusting means exterior to the bag and engaging said bars whereby the bars can be separated or approached and the bag walls tensioned or relaxed, said adjusting means not penetrating the walls of the bag.

In testimony that I claim the foregoing as my own, I affix my signature in presence of two witnesses.

CHARLES L. VAN FOSSEN.

Witnesses:
FERDINAND LETT,
W. E. BURDAKIN.